(12) United States Patent
Horie et al.

(10) Patent No.: US 7,929,139 B2
(45) Date of Patent: Apr. 19, 2011

(54) SPECTROSCOPIC ELLIPSOMETER, FILM THICKNESS MEASURING APPARATUS, AND METHOD OF FOCUSING IN SPECTROSCOPIC ELLIPSOMETER

(75) Inventors: Masahiro Horie, Kyoto (JP); Kumiko Fukue, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 383 days.

(21) Appl. No.: 12/196,463

(22) Filed: Aug. 22, 2008

(65) Prior Publication Data

US 2009/0059228 A1 Mar. 5, 2009

(30) Foreign Application Priority Data

Aug. 30, 2007 (JP) ............................... P2007-223897

(51) Int. Cl.
*G01J 4/00* (2006.01)
(52) U.S. Cl. ....................................................... 356/369
(58) Field of Classification Search .................. None
See application file for complete search history.

(56) References Cited

U.S. PATENT DOCUMENTS

| 5,608,526 | A |   | 3/1997  | Piwonka-Corle et al. |         |
|-----------|---|---|---------|----------------------|---------|
| 5,943,122 | A | * | 8/1999  | Holmes ............... | 356/328 |
| 5,991,037 | A |   | 11/1999 | Piel et al.          |         |
| 7,372,565 | B1| * | 5/2008  | Holden et al. ........| 356/327 |
| 2002/0097406 | A1 | * | 7/2002 | Fielden et al. ....... | 356/369 |
| 2005/0195398 | A1 | * | 9/2005 | Adel et al. .......... | 356/401 |
| 2006/0049480 | A1 | * | 3/2006 | Naka et al. .......... | 257/521 |
| 2008/0037005 | A1 | * | 2/2008 | Bareket et al. ....... | 356/326 |

FOREIGN PATENT DOCUMENTS

| JP | 11-510897   | 9/1999 |
|----|-------------|--------|
| JP | 2005-003666 | 1/2005 |

* cited by examiner

*Primary Examiner* — Gregory J Toatley
*Assistant Examiner* — Juan D Valentin
(74) *Attorney, Agent, or Firm* — McDermott Will & Emery LLP

(57) ABSTRACT

In a spectroscopic ellipsometer, light emitted from a light source enters a measurement surface of a substrate through an optical system in a lighting part so as to incline to the measurement surface to be directed to a light receiving device, and ellipsometry is performed based on spectral intensity of reflected light reflected on the measurement surface, the spectral intensity being acquired by the light receiving device. In focusing of the spectroscopic ellipsometer, a focus position of the measurement surface is obtained based on a total light amount in a predetermined wavelength band of the reflected light, the total light amount being obtained by the light receiving device. In the spectroscopic ellipsometer, since the optical system for ellipsometry and the optical system for focusing are common, it is possible to eliminate influences of change of the optical systems by temperature change or the like and to achieve high accurate focusing.

10 Claims, 10 Drawing Sheets

VERTICAL POSITION OF
MEASUREMENT SURFACE OF SUBSTRATE

VERTICAL POSITION OF
MEASUREMENT SURFACE OF SUBSTRATE

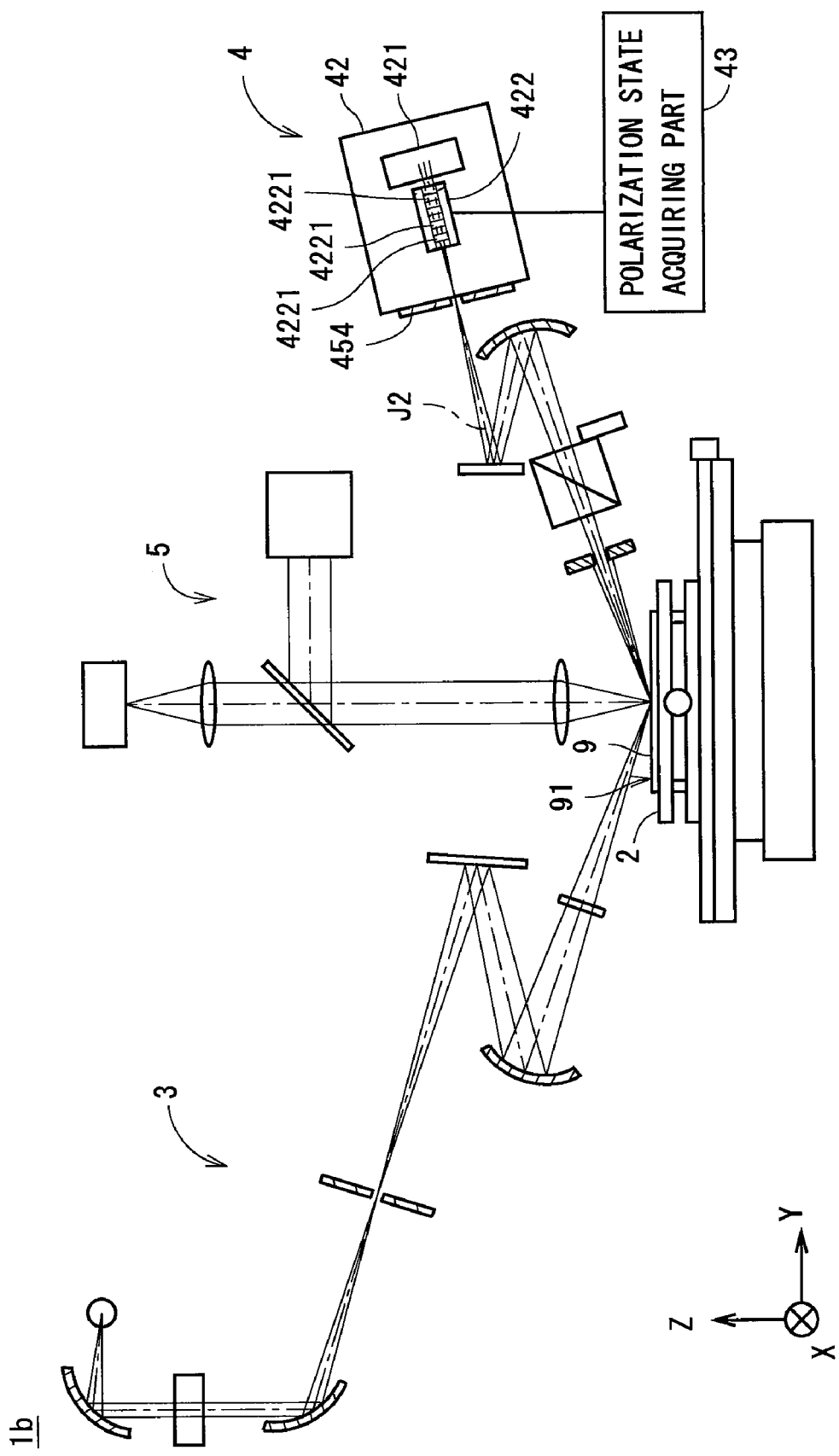

VERTICAL POSITION OF
MEASUREMENT SURFACE OF SUBSTRATE

SPECTROSCOPIC ELLIPSOMETER, FILM THICKNESS MEASURING APPARATUS, AND METHOD OF FOCUSING IN SPECTROSCOPIC ELLIPSOMETER

BACKGROUND OF THE INVENTION

1. Field of the Invention

The present invention relates to a spectroscopic ellipsometer and a method of focusing in the spectroscopic ellipsometer, and also relates to a film thickness measuring apparatus having the spectroscopic ellipsometer.

2. Description of the Background Art

Conventionally, an ellipsometer is used as an optical measuring apparatus for measuring a thickness or a surface state of a film formed on an object. In the ellipsometer, polarized light is applied to a measurement surface of the object so as to incline to the measurement surface, a polarization state of reflected light reflected on the measurement surface is acquired and ellipsometry is performed to measure a thickness of a film formed on a substrate and a surface state of the measurement surface. For example, U.S. Pat. No. 5,608,526 (Document 1) and Japanese Patent Application Laid-Open No. 2005-3666 (Document 2) disclose a spectroscopic ellipsometer for performing various measurements (e.g., film thickness measurement) on a thin film formed on an object on the basis of a polarization state at each wavelength of reflected light.

In such a spectroscopic ellipsometer, focusing is performed by moving an object in a vertical direction so that a convergence position where polarized light applied to the object is most converged is located on a measurement surface of the object. If the measurement surface of the object slightly moves from a position in a vertical direction where the measurement surface of the object overlaps with the convergence position (the position is referred to as a "focus position"), a position of an irradiation region on the measurement surface of the polarized light also moves. For this reason, in the spectroscopic ellipsometer, it is necessary that focusing is accurately performed before ellipsometry and especially, in a case where ellipsometry of a semiconductor substrate in which a fine pattern is formed or the like is performed, focusing with higher accuracy should be performed.

However, normally, the focal depth of light which enters an object so as to be perpendicular to the object is deeper than that of light which enters a measurement surface of an object so as to incline to the measurement surface. If focusing is performed with an observation optical system of vertical incident light type like in Document 1, there is a case where a required accuracy in focusing is not satisfied in a measurement optical system for ellipsometry where polarized light is applied to the object so as to incline to the object.

In order to achieve high accurate focusing, a relative position of the two optical systems must be adjusted so that an irradiation region by the measurement optical system for ellipsometry overlaps with an irradiation region by the observation optical system for focusing with accuracy. In the spectroscopic ellipsometer of Document 1, however, since the two optical systems are provided independently of each other, there is a possibility that the relative position of the both optical systems is apart from the original position in adjusting, because of a difference between expansion rates by temperatures of the optical systems or the like.

In the spectroscopic ellipsometer of Document 2, light emitted from an observation optical system for focusing is incident on the object so as to incline to the object like in that emitted from a measurement optical system for ellipsometry, and it is therefore possible to prevent decrease of the accuracy of focusing by a difference between focal depths. However, since a substrate imaging part and an optical system around the substrate imaging part are provided independently of the measurement optical system, it is difficult to prevent positional shift of the relative position of the two optical systems and there is a limitation in improving the accuracy of focusing.

SUMMARY OF THE INVENTION

The present invention is intended for a spectroscopic ellipsometer. It is an object of the present invention to perform focusing of the spectroscopic ellipsometer with high accuracy.

The spectroscopic ellipsometer comprises: a holding part for holding an object having a measurement surface; an elevating mechanism for moving the object together with the holding part in a vertical direction perpendicular to the measurement surface; a lighting part for emitting polarized light to the measurement surface, the polarized light being inclined to the measurement surface; an analyzer where reflected light of the polarized light enters; a spectral splitting device for spectrally splitting the reflected light after passing through the analyzer, to obtain spectrally split light; a light receiving device for receiving the spectrally split light to acquire spectral intensity of the reflected light; a polarization state acquiring part for acquiring a polarization state at each wavelength of the reflected light on the basis of output of the light receiving device; an incidence restricting part which restricts incidence of the reflected light to the spectral splitting device when the measurement surface is apart from a focus position in the vertical direction; and a focus information acquiring part which obtains a total light amount in at least part of wavelength band of the reflected light on the basis of output of the light receiving device while the measurement surface moves by the elevating mechanism, to acquire a relationship between vertical position of the measurement surface and the total light amount. In the spectroscopic ellipsometer, an optical system used for ellipsometry and an optical system used for focusing are common and focusing can be performed with high accuracy by using the reflected light of the light which enters the measurement surface, the light being inclined to the measurement surface.

According to a preferred embodiment of the present invention, the spectroscopic ellipsometer further comprises: a modification value storing part for storing a modification value, in advance, which represents a distance between the focus position and a position which is obtained from the relationship between the vertical position of the measurement surface and the total light amount; and a focus position determining part for obtaining the focus position on the basis of the modification value and the relationship between the vertical position of the measurement surface and the total light amount.

According to another preferred embodiment of the present invention, the spectroscopic ellipsometer further comprises a rotation mechanism for rotating the analyzer around a central axis parallel to an optical axis, and in the spectroscopic ellipsometer, the measurement surface is located at a predetermined vertical position and the analyzer is rotated and fixed at a rotation position where the total light amount becomes a maximum value, before obtaining the relationship between the vertical position of the measurement surface and the total light amount.

According to still another preferred embodiment of the present invention, the light receiving device is a light receiving element array in which a plurality of light receiving elements are arranged in parallel with a splitting direction of the reflected light, and the spectrally split light moves in a direction perpendicular to the splitting direction on a light receiving surface of the light receiving device when the measurement surface moves from the focus position in the vertical direction.

According to an aspect of the present invention, the spectroscopic ellipsometer comprises: a holding part for holding an object having a measurement surface; an elevating mechanism for moving the object together with the holding part in a vertical direction perpendicular to the measurement surface; a lighting part for emitting polarized light to the measurement surface, the polarized light being inclined to the measurement surface; an analyzer where reflected light of the polarized light enters; a spectral splitting device for spectrally splitting the reflected light after passing through the analyzer by a diffraction grating, to obtain spectrally split light; a first light receiving device for receiving the spectrally split light to acquire spectral intensity of the reflected light; a polarization state acquiring part for acquiring a polarization state at each wavelength of the reflected light on the basis of output of the first light receiving device; a small aperture member having a small aperture positioned at a position which is optically conjugate to the measurement surface when the measurement surface is located at a focus position, zeroth order diffracted light reflected by the spectral splitting device being directed to the small aperture member; and a second light receiving device for acquiring intensity of light after passing through the small aperture member.

The present invention is also intended for a film thickness measuring apparatus for measuring a thickness of a film formed on an object and still also intended for a method of focusing in a spectroscopic ellipsometer.

These and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a view showing a construction of a spectroscopic ellipsometer in accordance with the third preferred embodiment;

DESCRIPTION OF THE PREFERRED EMBODIMENTS

Figure 1:
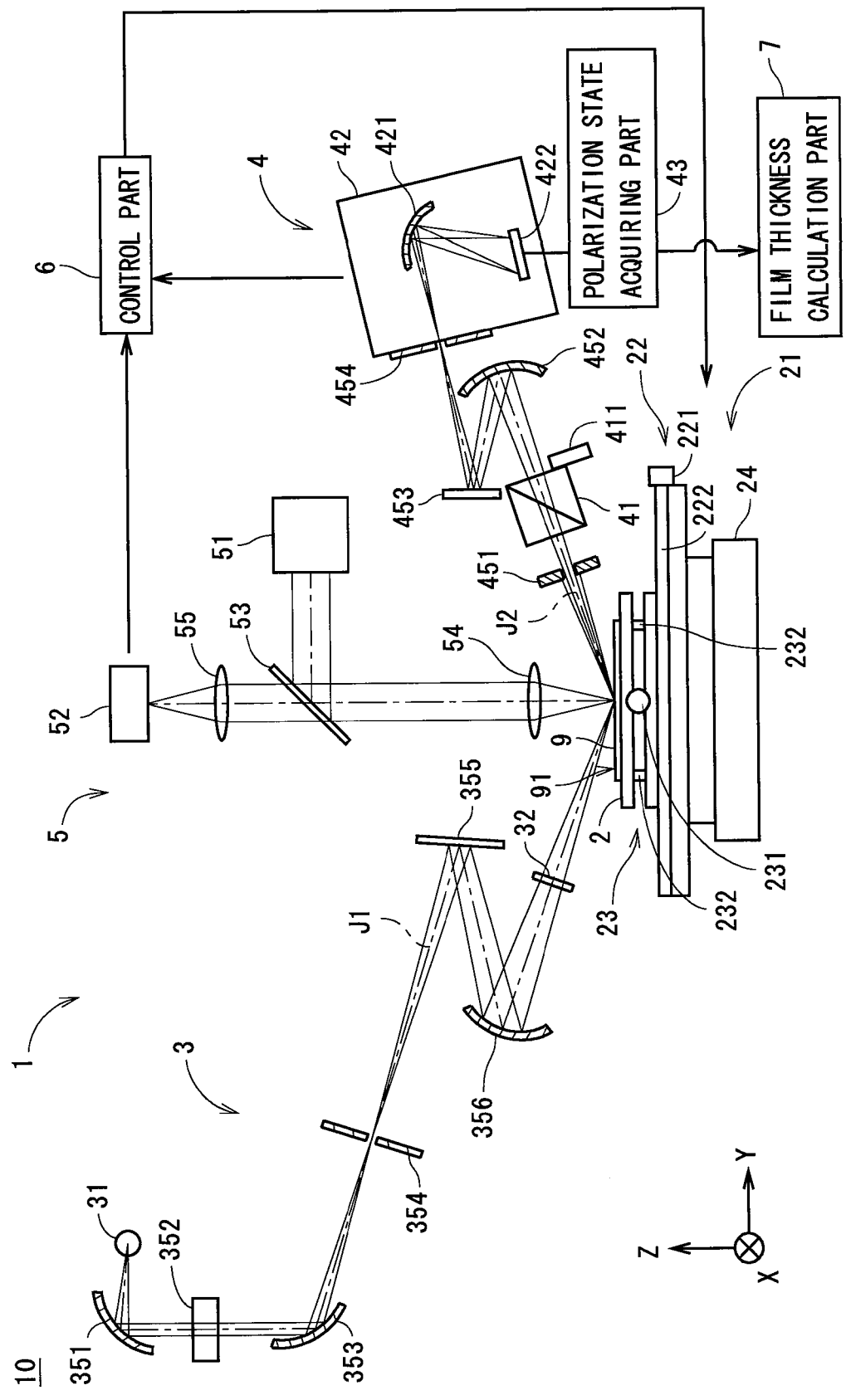
FIG. 1 is a view showing a construction of a film thickness measuring apparatus in accordance with the first preferred embodiment.

FIG. 1 is a view showing a construction of a film thickness measuring apparatus 10 in accordance with the first preferred embodiment of the present invention. The film thickness measuring apparatus 10 is an apparatus for measuring a thickness of a thin film formed on a semiconductor substrate 9 which is a measurement object. In the following discussion, the semiconductor substrate 9 is simply referred to as a "substrate 9". In FIG. 1, a part of the construction of the film thickness measuring apparatus 10 is shown cross-sectionally and an internal construction of a spectrometer 42 is shown.

As shown in FIG. 1, the film thickness measuring apparatus 10 has a spectroscopic ellipsometer 1 for applying polarized light to a main surface 91 on the substrate 9, a thin film being formed on the main surface 91 (i.e., the main surface 91 is a main surface to be measured on the (+Z) side in FIG. 1 and hereinafter, referred to as a "measurement surface 91"), to acquire information which is used to perform ellipsometry on the measurement surface 91 and a film thickness calculation part 7 for performing ellipsometry on the basis of the information acquired by the spectroscopic ellipsometer 1 to obtain a thickness of the film formed on the measurement surface 91.

The spectroscopic ellipsometer 1 has a stage 2 which is a holding part for holding the substrate 9 having the measurement surface 91, a stage moving mechanism 21 for moving the stage 2, a lighting part 3 for emitting polarized light to the measurement surface 91 of the substrate 9, the polarized light being inclined to the measurement surface 91, a light receiving part 4 for receiving reflected light of the polarized light which is emitted from the lighting part 3, a substrate observing part 5 which is used for position adjustment of the substrate 9 in a direction along the measurement surface 91 (i.e., the direction is the X direction and the Y direction in FIG. 1), and a control part 6 which is constituted of a CPU for performing various computations, a memory for storing various pieces of information and the like and controls the above constituent elements.

Figure 2:
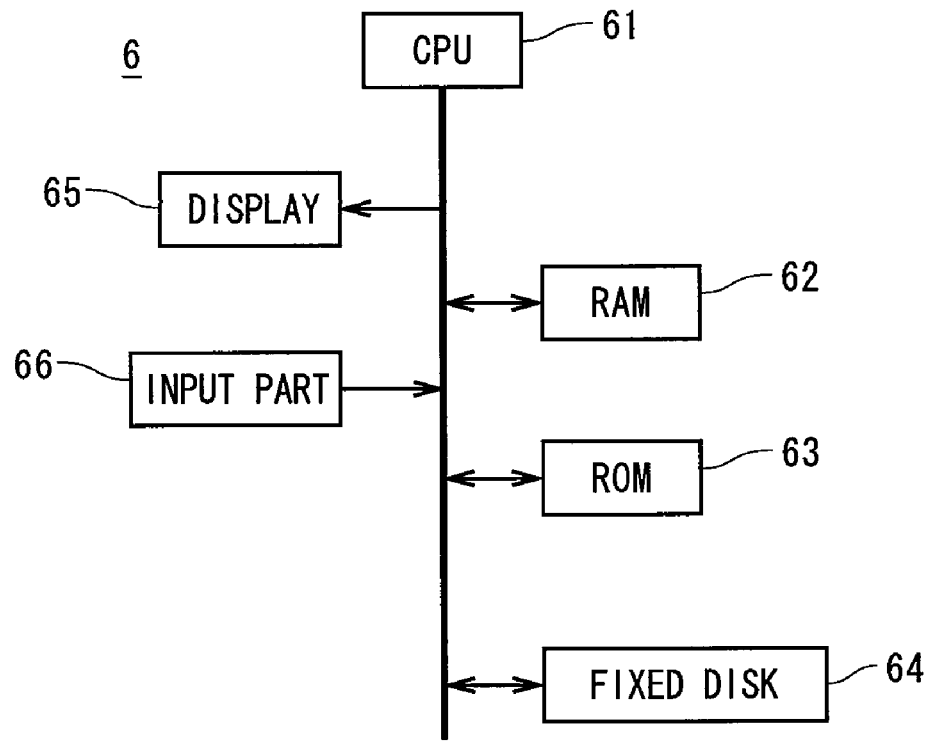
FIG. 2 is a view showing a constitution of a control part.

FIG. 2 is a view showing a constitution of the control part 6. As shown in FIG. 2, the control part 6 has a construction, like a general-type computer, in which a CPU 61 for performing various computations, a RAM 62 storing programs to be executed and serving as a work area for various computations, a ROM 63 for storing a basic program, a fixed disk 64 for storing various pieces of information, a display 65 for displaying various pieces of information to an operator, an input part 66 such as a keyboard and a mouse, and the like are all connected to one another.

Figure 3:
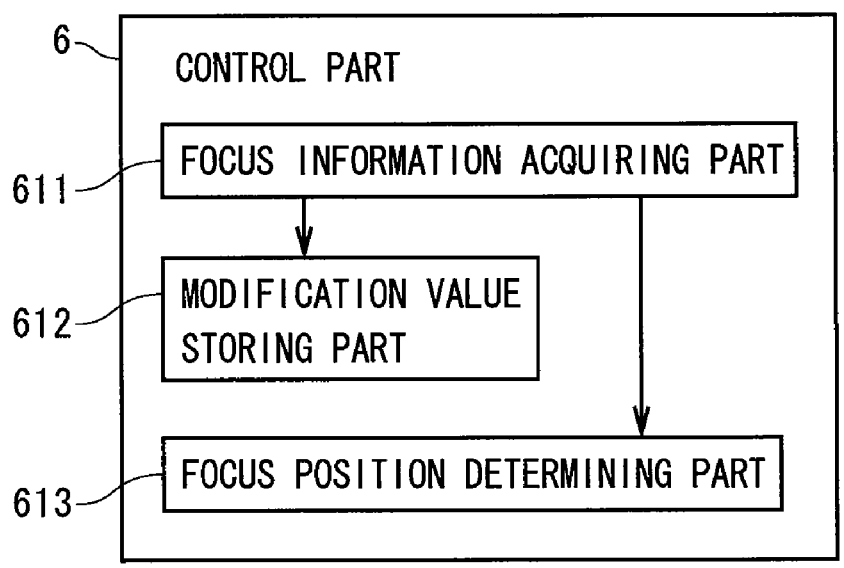
FIG. 3 is a block diagram showing functions of the control part.

FIG. 3 is a block diagram showing functions implemented through computations performed by the CPU 61 and the like in the control part 6 (see FIG. 2) in accordance with the program. A focus information acquiring part 611, a modification value storing part 612, and a focus position determining part 613 in FIG. 3 correspond to functions implemented by the CPU 61 and the like. These functions may be implemented by a plurality of computers. In the control part 6, a modification value used in later-discussed focusing of the spectroscopic ellipsometer 1 is stored in the modification value storing part 612 in advance.

As shown in FIG. 1, the stage moving mechanism 21 has a Y-direction moving mechanism 22 for moving the stage 2 in the Y direction of FIG. 1 and an X-direction moving mechanism 23 for moving the stage 2 in the X direction. The Y-direction moving mechanism 22 has a motor 221 and a ball screw (not shown) connected with the motor 221, and with rotation of the motor 221, the X-direction moving mechanism 23 moves in the Y direction of FIG. 1 along guide rails 222. The X-direction moving mechanism 23 has the same constitution as the Y-direction moving mechanism 22, and with rotation of a motor 231, the stage 2 is moved by a ball screw (not shown) in the X direction along guide rails 232. The stage moving mechanism 21 further has an elevating mechanism 24 for moving the substrate 9 together with the stage 2 in a vertical direction (the Z direction in FIG. 1) perpendicular to the measurement surface 91 of the substrate 9. When focusing of the spectroscopic ellipsometer 1 is performed, vertical movement of the substrate 9 is performed by the elevating mechanism 24.

The lighting part 3 has a light source 31 which is a high-intensity xenon (Xe) lamp for emitting white light, various optical elements for directing light from the light source 31, and a sheet-like (or a thin-plate) polarizer 32. The light emitted from the light source 31 is polarized by the polarizer 32 and the polarized light enters the measurement surface 91 of the substrate 9 from the lighting part 3 so as to incline to the measurement surface 91 (at an incident angle of 70 degrees in the present preferred embodiment).

The light receiving part 4 has an analyzer 41 where the reflected light of the polarized light enters, an analyzer rotation mechanism 411 for rotating the analyzer 41 around a central axis parallel to an optical axis J2, the spectrometer 42 of grating type for receiving the reflected light after passing through the analyzer 41, various optical elements for directing the reflected light to the spectrometer 42, and a polarization state acquiring part 43 connected to the spectrometer 42. The spectrometer 42 has a grating 421 which is a spectral splitting device for receiving the reflected light after passing through the analyzer 41 and spectrally splitting the reflected light into light at each wavelength, to obtain spectrally split light, and a light receiving device 422 for receiving the spectrally split light to acquire spectral intensity of the reflected light (i.e., light intensity at each wavelength). In the light receiving part 4, the polarization state acquiring part 43 acquires a polarization state at each wavelength of the reflected light on the basis of a rotation position of the analyzer 41 and output of the light receiving device 422.

The substrate observing part 5 has an observation light source 51 for emitting white light and a camera 52 for position adjustment of the substrate 9. Light emitted from the observation light source 51 enters the measurement surface 91 of the substrate 9 through a half mirror 53 and an objective lens 54 so as to be perpendicular to the measurement surface 91, and reflected light reflected on the substrate 9 is received by the camera 52 through the half mirror 53 and a lens 55. In the spectroscopic ellipsometer 1, the camera 52 picks up an image of a mark for position adjustment (so-called alignment mark) provided on the measurement surface 91 of the substrate 9. The control part 6 controls the X-direction moving mechanism 23 and the Y-direction moving mechanism 22 in the stage moving mechanism 21 on the basis of the image of the mark and performs position adjustment of the substrate 9 in the X direction and the Y direction.

Next, discussion will be made on details of the lighting part 3 and the light receiving part 4. In the lighting part 3, the light emitted from the light source 31 is directed to an aperture of a slit plate 354 through an aspherical mirror (hereinafter, referred to as "ellipsoidal mirror") 351 whose reflective surface is a part of a rotationally symmetric ellipsoidal surface (spheroidal surface), an infrared cut filter 352, and an ellipsoidal mirror 353. In the slit plate 354, the shape of the aperture in a direction perpendicular to an optical axis J1 of the light from the light source 31 has a rectangular shape with long sides of 150 μm parallel to the X axis and short sides of 50 μm orthogonal thereto. Light after passing through the aperture is directed to a plane mirror 355, gradually expanding so that sine of an angle $\theta_1$ formed between the light and the optical axis J1 is 0.02.

The light from the slit plate 354 is reflected on the plane mirror 355 and further directed to the ellipsoidal mirror 356, and light reflected on the ellipsoidal mirror 356 is directed to the polarizer 32 while being collected at a numerical aperture (NA) of 0.1. Then, polarized light which is led out by the polarizer 32 is applied to an irradiation region on the substrate 9 at an incident angle of 70 degrees. In the lighting part 3, since the optical system from the slit plate 354 to the substrate 9 is a minification optical system at a ratio of 5:1, the luminous flux section perpendicular to the optical axis J1 of the polarized light near the measurement surface 91 of the substrate 9 has a rectangular shape with long sides of 30 μm parallel to the X axis and short sides of 10 μm orthogonal thereto. Therefore, the irradiation region of the polarized light on the substrate 9 is a region of square with sides of about 30 μm×30 μm.

The reflected light reflected on the substrate 9 is drawn into a slit plate 451 of the light receiving part 4 and led out to the analyzer 41. An aperture of the slit plate 451 has a rectangular shape with sufficiently long sides parallel to the X axis and short sides orthogonal thereto, and $\sin \theta_2$ is 0.05 where $2\theta_2$ is an angle viewing the aperture of the slit plate 451 from the measurement surface 91 with respect to a direction perpendicular to the X axis (a direction which almost corresponds to height). This limits a range of reflection angle on the substrate 9 of the reflected light which is drawn into the slit plate 451 and the reflected light almost becomes parallel light. On the other hand, since most of the reflected light is not limited in the X direction, a sufficient amount of light for measurement is led to the analyzer 41. In the present preferred embodiment, a Glan-Thompson prism or a polarizing sheet is used as the analyzer 41.

The analyzer 41 rotates around the axis parallel to the optical axis J2 by the analyzer rotation mechanism 411 (e.g., a stepping motor) which is controlled by the control part 6 and thereby, polarized light in accordance with a rotation angle of the analyzer rotation mechanism 411 (i.e., in accordance with a rotation position of the analyzer 41) is led out from the analyzer 41. The polarized light after passing through the rotating analyzer 41 is reflected on an ellipsoidal mirror 452 to be directed to a plane mirror 453, and enters the spectrometer 42 through an aperture of a slit plate 454 which is fixed on the spectrometer 42. The aperture of the slit plate 454 is a square with sides of 100 μm×100 μm, and the aperture is positioned at a position which is optically conjugate to the irradiation region on the measurement surface 91 of the substrate 9 after focusing.

Reflected light incident on the spectrometer 42 is reflected on the grating 421 to be spectrally split with high wavelength resolution, and it is received by the light receiving device 422 and intensity of light at each wavelength (e.g., each wavelength from ultraviolet ray to near-infrared ray) is measured with high sensitivity. A splitting direction of light from the grating 421 on a light receiving surface of the light receiving device 422 (i.e., a direction where light at each wavelength is positioned) is parallel to an ideal surface perpendicular to the measurement surface 91, the ideal surface including the optical axis J1 on the substrate 9 of the lighting part 3. In the present preferred embodiment, a light receiving element array in which a plurality of light receiving elements are arranged in a line in parallel with the splitting direction of the reflected light reflected on the light receiving surface is used as the light receiving device 422. In the light receiving device 422, the plurality of light receiving elements may be arranged in two lines or more in parallel with the splitting direction.

The spectral intensity of the reflected light acquired by the light receiving device 422 is outputted to the polarization state acquiring part 43 and in the polarization state acquiring part 43, the spectral intensity of the reflected light is associated with the rotation angle of the analyzer 41 on the basis of outputs of the light receiving device 422 and the analyzer rotation mechanism 411, to acquire a polarization state at each wavelength of the reflected light, specifically, a phase difference $\Delta$ between a p-polarized component and an s-polarized component at each wavelength and an angle $\psi$ whose tangent gives an amplitude ratio of these reflected polarized components (i.e., a complex amplitude ratio). The polarization state at each wavelength of the reflected light is outputted to the film thickness calculation part 7 from the polarization state acquiring part 43. In the film thickness calculation part 7, ellipsometry is performed on the basis of the polarization state at each wavelength of the reflected light, the polarization state being acquired by the light receiving part 4 in the spectroscopic ellipsometer 1, to obtain a thickness of the film formed on the measurement surface 91 of the substrate 9.

Figure 4:
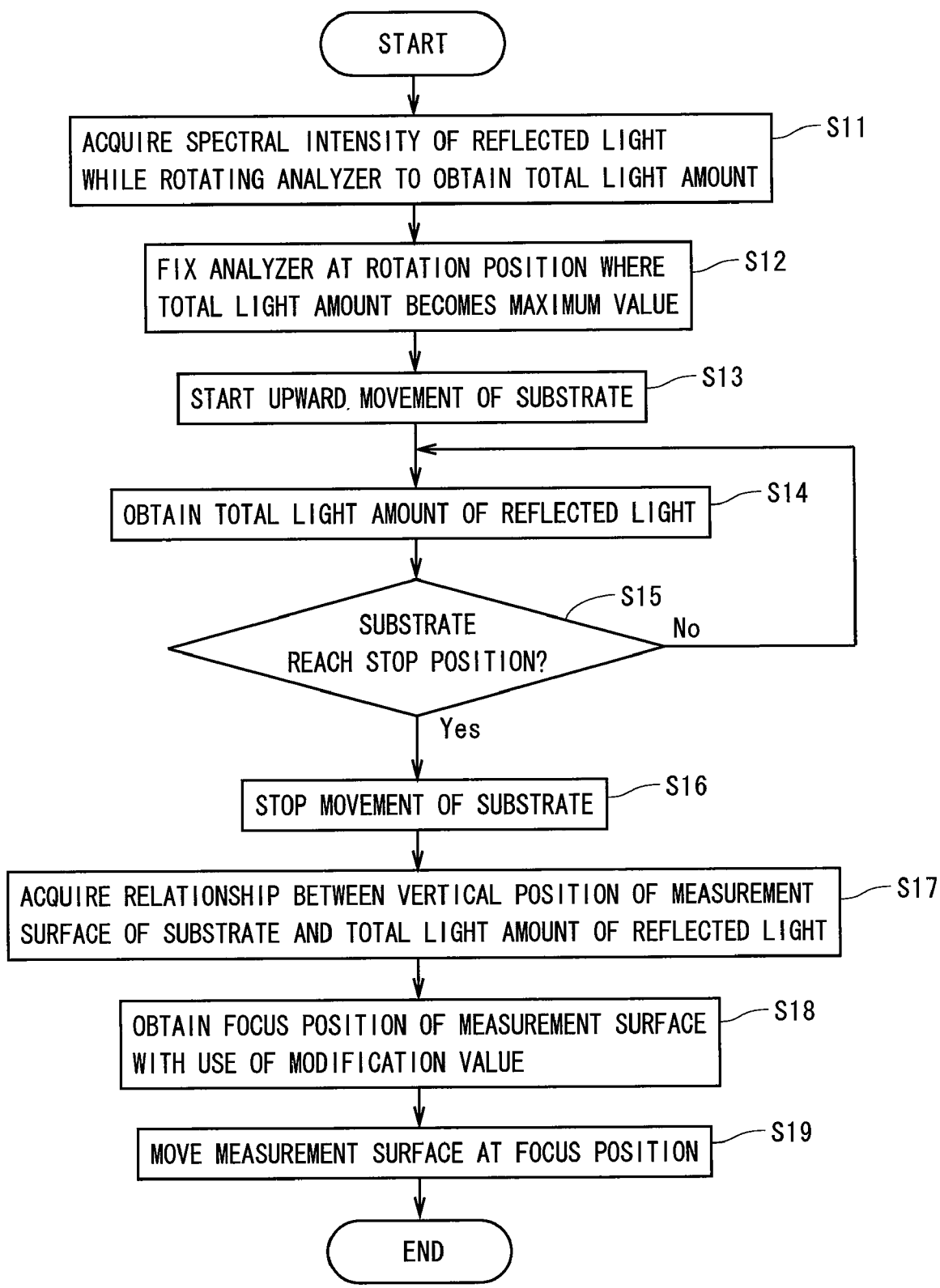
FIG. 4 is a flowchart showing a flow of focusing.

Next discussion will be made on focusing of the spectroscopic ellipsometer 1 which is performed before film thickness measurement on the substrate 9 in the film thickness measuring apparatus 10. The focusing is an operation for moving the substrate 9 in the vertical direction and making a convergence position which is a position where light emitted from the lighting part 3 is most converged coincide with the measurement surface 91. FIG. 4 is a flowchart showing a flow of focusing in the spectroscopic ellipsometer 1. When focusing is performed, first, the elevating mechanism 24 of the stage moving mechanism 21 shown in FIG. 1 is driven as necessary and the measurement surface 91 of the substrate 9 is positioned at a predetermined analyzer adjustment position in the vertical direction (preferably, the analyzer adjustment position is a position which is assumed to be close to a focus position (of the measurement surface 91) in which the convergence position where the polarized light applied from the lighting part 3 toward the substrate 9 is most converged is overlapped with the measurement surface 91). Subsequently, the measurement surface 91 is located at the analyzer adjustment position, light is applied from the lighting part 3 to the substrate 9 and the analyzer 41 is rotated by the analyzer rotation mechanism 411. Reflected light reflected on the substrate 9 passes through the rotating analyzer 41 to be received by the spectrometer 42.

In the spectrometer 42, spectral intensity of the reflected light is acquired by the light receiving device 422 and outputted to the focus information acquiring part 611 (see FIG. 3) in the control part 6. In the focus information acquiring part 611, obtained is a total light amount which is a total of light intensities at respective wavelengths in a predetermined wavelength band of the reflected light (in the preferred embodiment, the wavelength band includes all wavelength components of the reflected light which is received by the light receiving device 422) (Step S11). The total light amount is increased or decreased in accordance with the rotation position of the analyzer 41 and in the light receiving part 4, the analyzer 41 is fixed at a rotation position where the total light amount obtained by the focus information acquiring part 611 becomes the maximum value (Step S12).

The substrate 9 is moved on the (−Z) side in FIG. 1 together with the stage 2 by the elevating mechanism 24 to be positioned at a movement start position, and the substrate 9 starts to move from the movement start position toward the (+Z) direction (Step S13). Subsequently, in a state where the analyzer 41 in the light receiving part 4 is fixed (i.e., in a state where rotation of the analyzer 41 is stopped), polarized light from the lighting part 3 enters the measurement surface 91 of the substrate 9 so as to incline to the measurement surface 91, and reflected light reflected on the measurement surface 91 enters the spectrometer 42 through the slit plate 454 to be spectrally split by the grating 421. The spectrally split light is received by the light receiving device 422 and spectral intensity of reflected light is acquired, and a total light amount in a predetermined wavelength band of the reflected light is obtained on the basis of the output of the light receiving device 422 by the focus information acquiring part 611 (Step S14).

In the spectroscopic ellipsometer 1, until the substrate 9 reaches a predetermined stop position (Step S15), calculation of the total light amount of the reflected light by the focus information acquiring part 611 is repeated (Steps S14, S15) while performing movement of the substrate 9 toward the (+Z) direction, application of the polarized light from the lighting part 3, and receiving of the reflected light by the spectrometer 42. Then, upward movement of the substrate 9 (i.e., movement of the substrate 9 in the (+Z) direction) is stopped at the stop position (Step S16), and in the focus information acquiring part 611 in the control part 6, a position in the vertical direction of the measurement surface 91 of the substrate 9 (the position is hereinafter referred to as a "vertical position") is associated with a total light amount of the reflected light obtained by the focus information acquiring part 611 to acquire a relationship between vertical position of the measurement surface 91 and total light amount of the reflected light (Step S17).

In the spectroscopic ellipsometer 1 shown in FIG. 1, the substrate 9 moves in the vertical direction (i.e., in the Z direction) and thereby, the reflected light incident on the slit plate 454 in the light receiving part 4 also moves in the vertical direction. In a case where the measurement surface 91 of the substrate 9 is apart from the focus position by some distance in the vertical direction, the slit plate 454 blocks a part or all of incidence of the reflected light from the measurement surface 91 to the spectrometer 42. That is, the slit plate 454 is an incidence restricting part which restricts incidence of the reflected light from the measurement surface 91 to the grating 421 in the case that the measurement surface 91 is apart from the focus position in the vertical direction.

Figure 5:
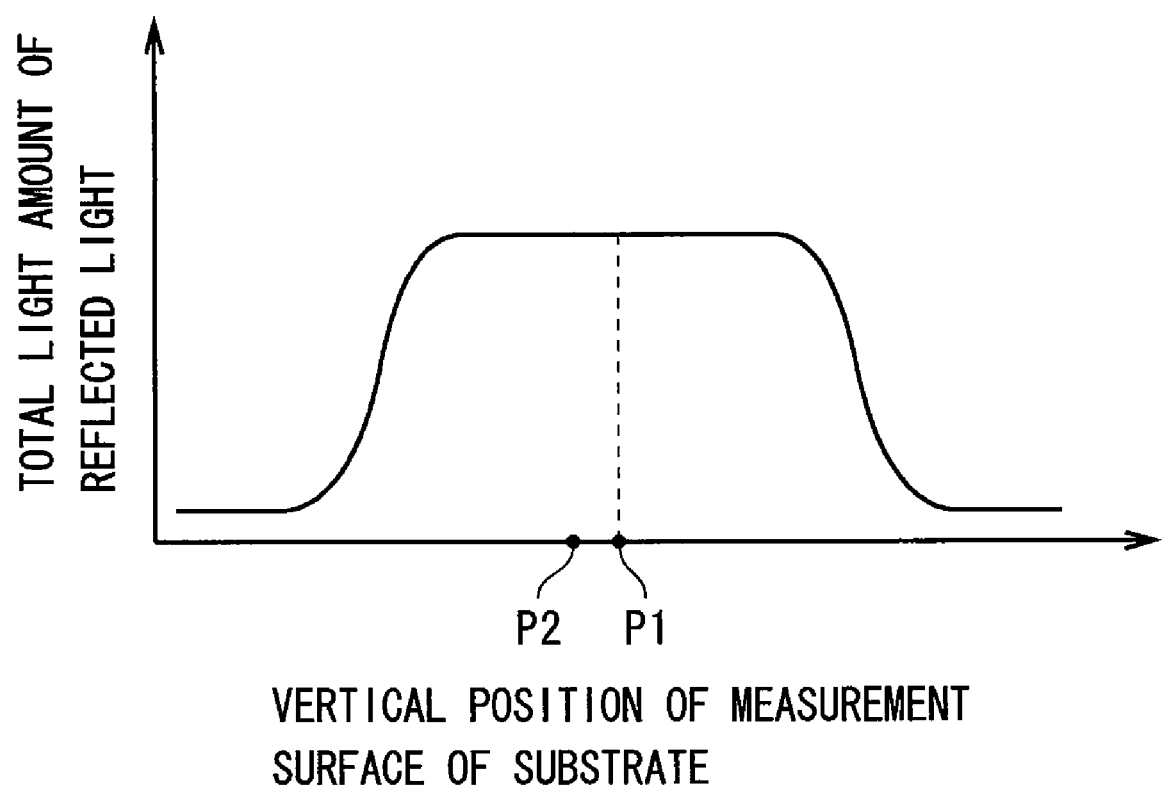
FIG. 5 is a graph showing a relationship between vertical position of a measurement surface of a substrate and total light amount of reflected light.

FIG. 5 is a graph showing the relationship between the vertical position of the measurement surface 91 of the substrate 9 and the total light amount of the reflected light. As shown in FIG. 5, the total light amount of the reflected light becomes the maximum value when the measurement surface 91 of the substrate 9 is located in a range of vertical position where the whole light directed to the slit plate 454 enters the grating 421 through the aperture of the slit plate 454.

After the relationship between the vertical position of the measurement surface 91 of the substrate 9 and the total light amount of the reflected light is obtained, the focus information acquiring part 611 obtains a range of vertical position of the measurement surface 91 where the total light amount becomes the maximum value and a center position P1 which is the center of the range. In the spectroscopic ellipsometer 1, as discussed above, since the aperture of the slit plate 454 is positioned at a position which is optically conjugate to the irradiation region on the measurement surface 91 of the substrate 9 after focusing and the aperture of the slit plate 454 is designed so that the reflected light passes the center of the aperture of the slit plate 454 in a state where the measurement surface 91 is located at the focus position, the convergence position of incident light from the lighting part 3 to the substrate 9 is theoretically positioned on the measurement surface 91 of the substrate 9 in a state where the measurement surface 91 of the substrate 9 is located at the center position P1 in FIG. 5. However, actually, there is a case where the vertical position of the measurement surface 91 when the measurement surface 91 is located at the convergence position of the incident light (i.e., the focus position) is slightly apart from the center position P1 in FIG. 5 by tolerances of each constituent element in the spectroscopic ellipsometer 1 or the like.

For this reason, in the spectroscopic ellipsometer 1, a modification value representing a distance in the vertical direction (i.e., the Z direction) between the center position P1 and the focus position is stored in the modification value storing part 612 in the control part 6 shown in FIG. 3 in advance. The focus position determining part 613 modifies the center position P1 with use of the modification value, and a focus position P2 of the measurement surface 91 is automatically obtained in the range of vertical position of the measurement surface 91 where the total light amount becomes the maximum value, as shown in FIG. 5 (Step S18). Calculation method of the modification value stored in the modification value storing part 612 will be discussed later.

As discussed above, after the focus position is obtained on the basis of the relationship between the vertical position of the measurement surface 91 of the substrate 9 and the total light amount of the reflected light, the elevating mechanism 24 shown in FIG. 1 is controlled by the control part 6, the substrate 9 moves in the vertical direction together with the stage 2 and the measurement surface 91 of the substrate 9 is positioned at the focus position, to thereby complete focusing of the spectroscopic ellipsometer 1 (Step S19).

Figure 6:
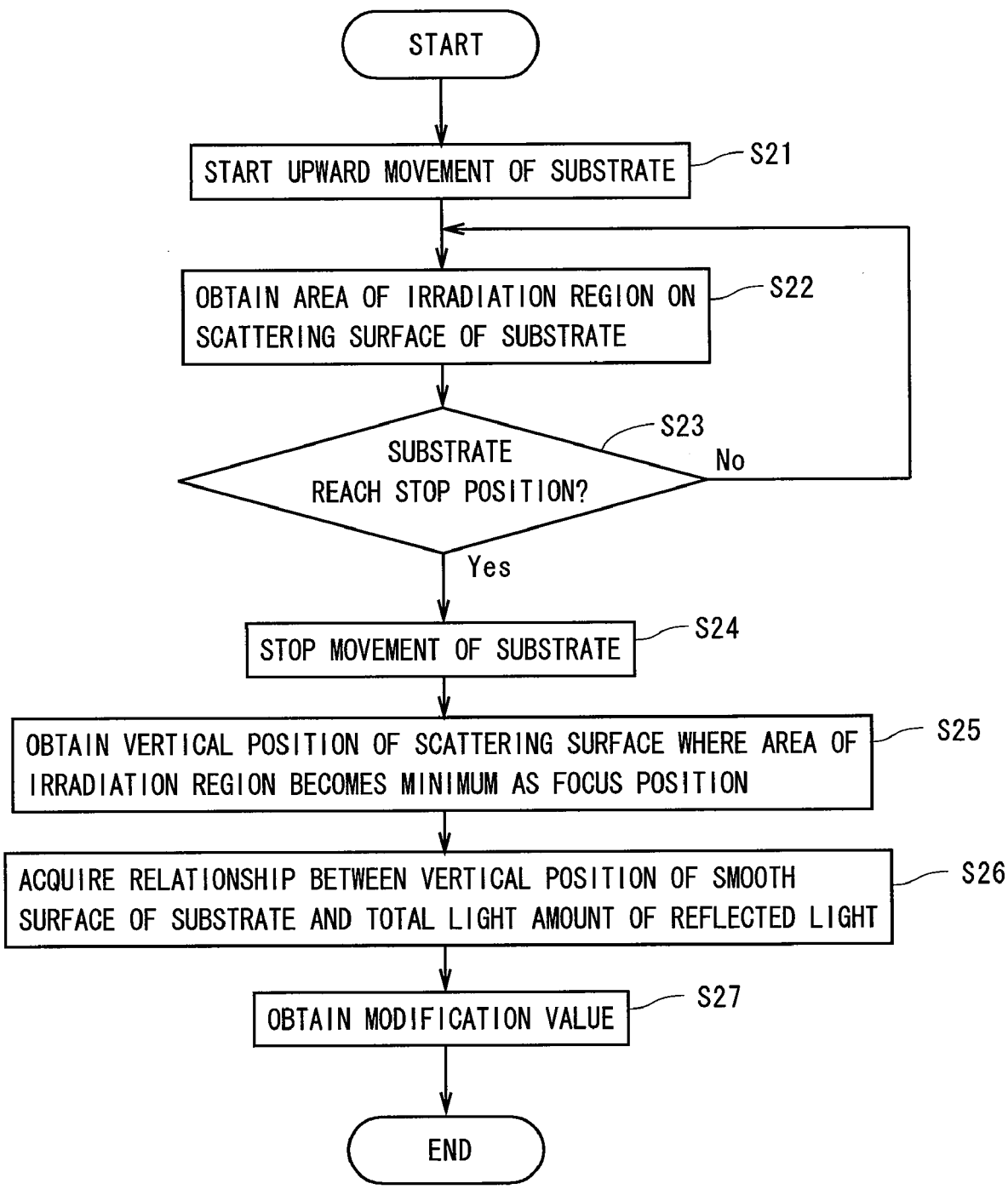
FIG. 6 is a flowchart showing a flow of calculation of a modification value.

Next discussion will be made on calculation method of the modification value used in the above Step S18. FIG. 6 is a flowchart showing a flow of calculation of the modification value. The modification value is obtained only once in focusing of the first substrate 9 on which film thickness measurement is performed in the film thickness measuring apparatus 10 or the modification value is obtained only once with use of a test substrate before the film thickness measurement, and stored in the modification value storing part 612 (see FIG. 3). In focusing of subsequent substrates, the modification value is read out and used from the modification value storing part 612. In the following description, the modification value is obtained with use of the test substrate.

In obtaining the modification value, first, a scattering member (e.g., an aluminum foil) for scattering the polarized light emitted from the lighting part 3 is positioned on a measurement surface of the test substrate. In the following description, a surface of the scattering member where the polarized light enters is referred to as a "scattering surface" and the scattering surface is parallel to the measurement surface of the test substrate.

Subsequently, the elevating mechanism 24 shown in FIG. 1 starts to move the test substrate from a movement start position toward the (+Z) direction (i.e., a direction perpendicular to the scattering surface) (Step S21), the polarized light emitted from the lighting part 3 is directed to the scattering surface on the test substrate so as to incline to the scattering surface, and scattered light on the scattering surface is received by the camera 52 through the objective lens 54, the half mirror 53, and the lens 55 which are arranged in the Z direction in the substrate observing part 5. In other words, an irradiation region of the polarized light in the scattering surface on the test substrate is observed by the substrate observing part 5. Then, an area of the irradiation region of the polarized light on the scattering surface of the test substrate is obtained from an image acquired by the camera 52 (Step S22).

In the spectroscopic ellipsometer 1, until the test substrate is positioned at a predetermined stop position (Step S23), calculation of an area of the irradiation region is repeated (Steps S22, S23) while performing movement of the test substrate toward the (+Z) direction, application of the polarized light from the lighting part 3 to the scattering surface, and observation of the irradiation region on the scattering surface by the camera 52. Then, movement of the test substrate in the vertical direction is stopped at the stop position (Step S24), and a vertical position of the scattering surface where the area of the irradiation region becomes minimum is obtained as the focus position on the basis of a relationship between vertical position of the scattering surface of the test substrate and the area of the irradiation region on the test substrate (Step S25).

Next, the same processes as Steps S11 to S17 shown in FIG. 4 are performed on an area on the measurement surface other than the scattering member on the test substrate (the area is referred to as a "smooth surface" for distinction from the scattering surface) (in other words, Steps S11 to S17 are performed on the smooth surface of the test substrate in stead of the measurement surface 91 of the substrate 9), to acquire a relationship between vertical position of the smooth surface of the test substrate and total light amount of reflected light (Step S26). Since the smooth surface is a part of the measurement surface, the smooth surface is parallel to the scattering surface as discussed above and the smooth surface exists on the (−Z) side of the scattering surface by a thickness of the scattering member.

In the relationship between the vertical position of the smooth surface of the test substrate and the total light amount of the reflected light, the center position in a range of vertical position of the smooth surface where the total light amount becomes the maximum value is obtained, a distance in the vertical direction between the center position and the focus position obtained in Step S25 (specifically, a distance which is obtained by modifying a difference between an instruction value of an encoder of the elevating mechanism 24 when the smooth surface is positioned at the center position and an instruction value of the encoder when the scattering surface is positioned at the focus position, by the thickness of the scattering member) is obtained as the above modification value (i.e., information used for calculation of the focus position of the measurement surface 91 of the substrate 9 in Step S18 is generated), and the modification value is stored in the modification value storing part 612 in the control part 6 (Step S27). The modification value is constant regardless of the thickness of the test substrate or the thickness of the substrate 9 which is an object of the film thickness measurement.

In calculation of the modification value, instead of Steps S21 to S25, there may be a case where, for example, a user observes an image of the irradiation region on the scattering surface, the image being acquired by the camera 52, while changing a vertical position of the scattering surface by manually operating the elevating mechanism 24, and the user determines a position where the area of the irradiation region is considered to be minimum as the focus position. In this case, movement in the vertical direction of the scattering surface may be performed only in the vicinity of a vertical position which is predicted as the focus position.

As discussed above, in the spectroscopic ellipsometer 1 of the film thickness measuring apparatus 10, since focusing is performed with use of the reflected light of the light which enters the measurement surface 91 of the substrate 9 from lighting part 3, the light being inclined to the measurement surface 91, it is possible to decrease the focal depth in an optical system of the lighting part 3 and improve the accuracy of focusing, as compared with the case where focusing is performed with use of an optical system of vertical incident light type where light is applied perpendicular to a substrate.

In a normal spectroscopic ellipsometer, at least parts of an optical system used for ellipsometry of a substrate and an optical system used for focusing are provided separately, and a relative position of the both optical systems is adjusted so that irradiation regions of the both optical systems overlap with high positional accuracy. However, in such a spectroscopic ellipsometer, there is a possibility that the relative position of the both optical systems is moved from the original position in adjusting, because of a difference between expansion rates by temperatures of the optical systems or the like.

On the other hand, in focusing of the spectroscopic ellipsometer 1 according to the present preferred embodiment, the light is directed to the light receiving device 422 only by the constituent elements used for ellipsometry of the measurement surface 91 of the substrate 9 (i.e., the constituent elements are the light source 31, the ellipsoidal mirror 351, the infrared cut filter 352, the ellipsoidal mirror 353, the slit plate 354, the plane mirror 355, the ellipsoidal mirror 356, and the polarizer 32 in the lighting part 3 and the slit plate 451, the analyzer 41, the ellipsoidal mirror 452, the plane mirror 453, the slit plate 454, and the grating 421 in the light receiving part 4), and the measurement surface 91 is moved to the focus position on the basis of the output of the light receiving device 422.

As discussed above, in the spectroscopic ellipsometer 1, since the optical system for ellipsometry and the optical system for focusing are common, it is possible to eliminate influences of change of the optical systems by temperature change or the like and to achieve high accurate focusing. As a result, the polarized light emitted from the lighting part 3 can be applied to the measurement surface 91 with high positional accuracy and the light intensity per unit area of the reflected light reflected on the measurement surface 91 can be increased, to thereby achieve high accurate film thickness measurement in the film thickness measuring apparatus 10.

In the spectroscopic ellipsometer 1, before obtaining the relationship between the vertical position of the measurement surface 91 and the total light amount of the reflected light, since the analyzer 41 is fixed at the rotation position where the total light amount in a predetermined vertical position becomes maximum, the relationship between the vertical position of the measurement surface 91 and the total light amount of the reflected light can be acquired with high accuracy and it is possible to further improve the accuracy of focusing.

In the spectroscopic ellipsometer 1, the focus position is automatically obtained with use of the center position P1 in the range of the vertical position where the total light amount becomes the maximum value in the relationship between the vertical position of the measurement surface 91 and the total light amount of the reflected light and the modification value which is stored in the modification value storing part 612 in advance. Thus, it is possible to modify positional shift of the focus position and the center position P1 by the tolerances of each constituent elements in the spectroscopic ellipsometer 1 or the like and to further improve the accuracy of focusing. In acquisition of the modification value, the focus position is obtained by observing the irradiation region on the scattering surface of the test substrate in the substrate observing part 5 as discussed above, and it is therefore possible to easily acquire the modification value.

Figure 7:
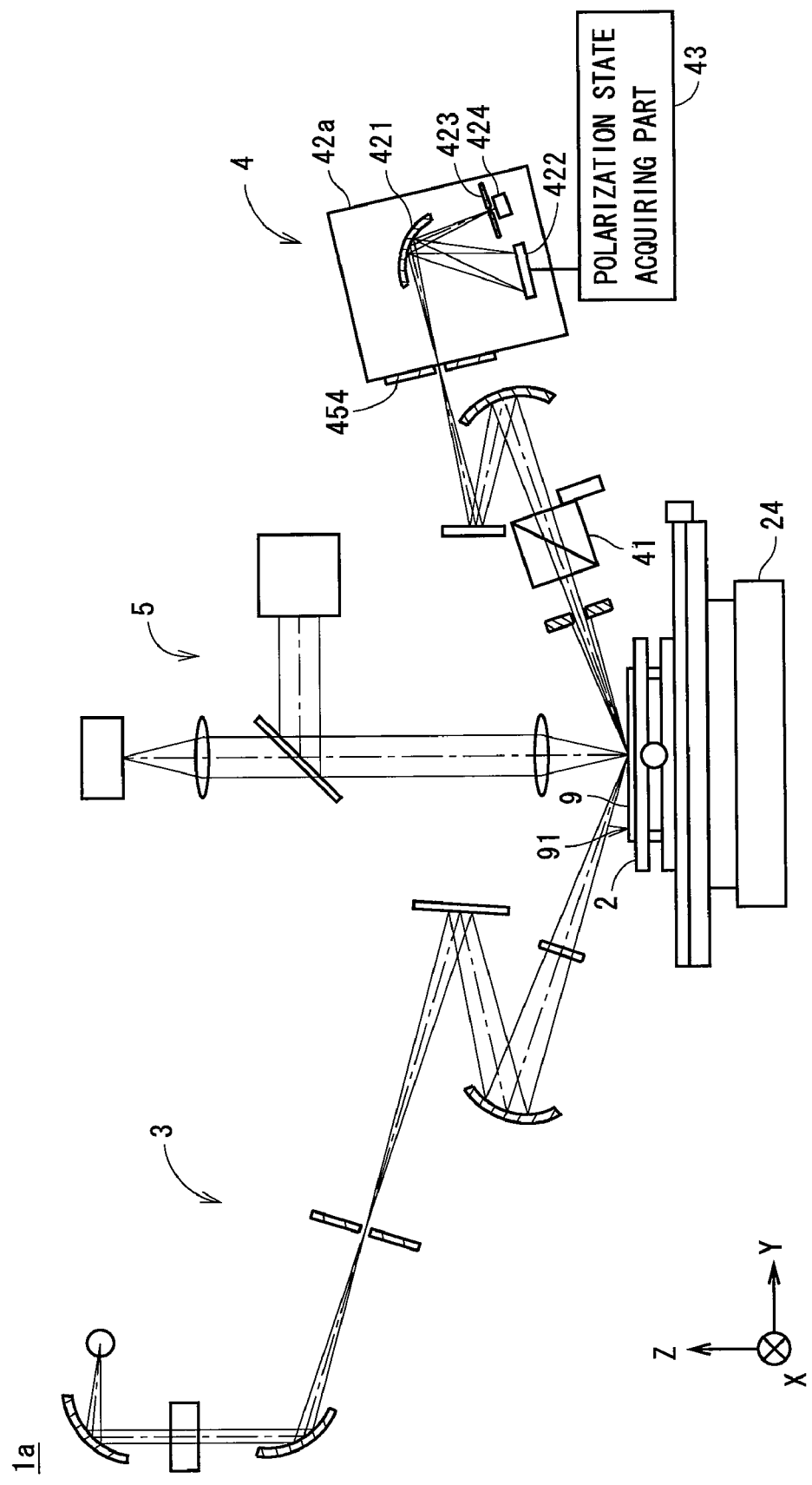
FIG. 7 is a view showing a construction of a spectroscopic ellipsometer in accordance with the second preferred embodiment.

Next, discussion will be made on a spectroscopic ellipsometer in a film thickness measuring apparatus in accordance with the second preferred embodiment of the present invention. FIG. 7 is a view showing a construction of a spectroscopic ellipsometer 1a according to the second preferred embodiment. As shown in FIG. 7, a spectrometer 42a which has a different construction from the spectrometer 42 in the spectroscopic ellipsometer 1 shown in FIG. 1 is provided in a light receiving part 4 in the spectroscopic ellipsometer 1a. The other constituent elements in the spectroscopic ellipsometer 1a are the same as those in the spectroscopic ellipsometer 1 shown in FIG. 1, and the same reference signs are given to the corresponding elements in the following description. In FIG. 7, a part of the construction of the spectroscopic ellipsometer 1a is shown cross-sectionally and the control part 6 is omitted (the same is applied to FIG. 10 discussed later).

The spectrometer 42a shown in FIG. 7 has the grating 421 which is a spectral splitting device for spectrally splitting reflected light after passing through an analyzer 41 by a diffraction grating to obtain spectrally split light and the light receiving device 422 for receiving the spectrally split light to acquire spectral intensity of the reflected light, similarly to the first preferred embodiment. The spectrometer 42a further has a pinhole plate 423 to which zeroth order diffracted light (i.e., normally reflected light) reflected by the grating 421 is directed and another light receiving device 424 for receiving light after passing through a small aperture of the pinhole plate 423 to acquire intensity of the light. In the following description, the light receiving device 422 and another light receiving device 424 which is provided independently of the light receiving device 422 are referred to as a "first light receiving device 422" and a "second light receiving device 424" for distinction.

In the spectroscopic ellipsometer 1a, a photodiode is used as the second light receiving device 424, and the light receiving element array in which the plurality of light receiving elements are arranged in a line along the splitting direction on the light receiving surface is used as the first light receiving device 422, similarly to the first preferred embodiment. The small aperture of the pinhole plate 423 is smaller than an image of the aperture of the slit plate 454 in a heightwise direction of the image (i.e., a direction corresponding to the vertical direction of the aperture) which is projected on the pinhole plate 423 by the grating 421, and the small aperture of the pinhole plate 423 is located at a position which is optically conjugate to the aperture of the slit plate 454. Therefore, in a state where the measurement surface 91 of the substrate 9 is located at a focus position, the small aperture of the pinhole plate 423 is positioned at a position which is optically conjugate to the measurement surface 91 of the substrate 9.

When a thickness of a film formed on the substrate 9 is measured in the film thickness measuring apparatus according to the second preferred embodiment, similarly to the first preferred embodiment, polarized light emitted from the lighting part 3 enters the measurement surface 91 of the substrate 9 which is held on the stage 2, the polarized light being inclined to the measurement surface 91, and reflected light reflected on the measurement surface 91 is incident on the spectrometer 42a through the rotating analyzer 41 and the slit plate 454. The reflected light reflected on the measurement surface 91 is spectrally split by the grating 421 in the spectrometer 42a and spectrally split light is received by the first light receiving device 422 which is the light receiving element array to acquire spectral intensity of the reflected light. Then, the polarization state acquiring part 43 acquires a polarization state at each wavelength of the reflected light on the basis of output of the first light receiving device 422, and the film thickness calculation part 7 (see FIG. 1) performs ellipsometry on the basis of the polarization state at each wavelength of the reflected light, to obtain a thickness of the film formed on the measurement surface 91 of the substrate 9.

Figure 8:
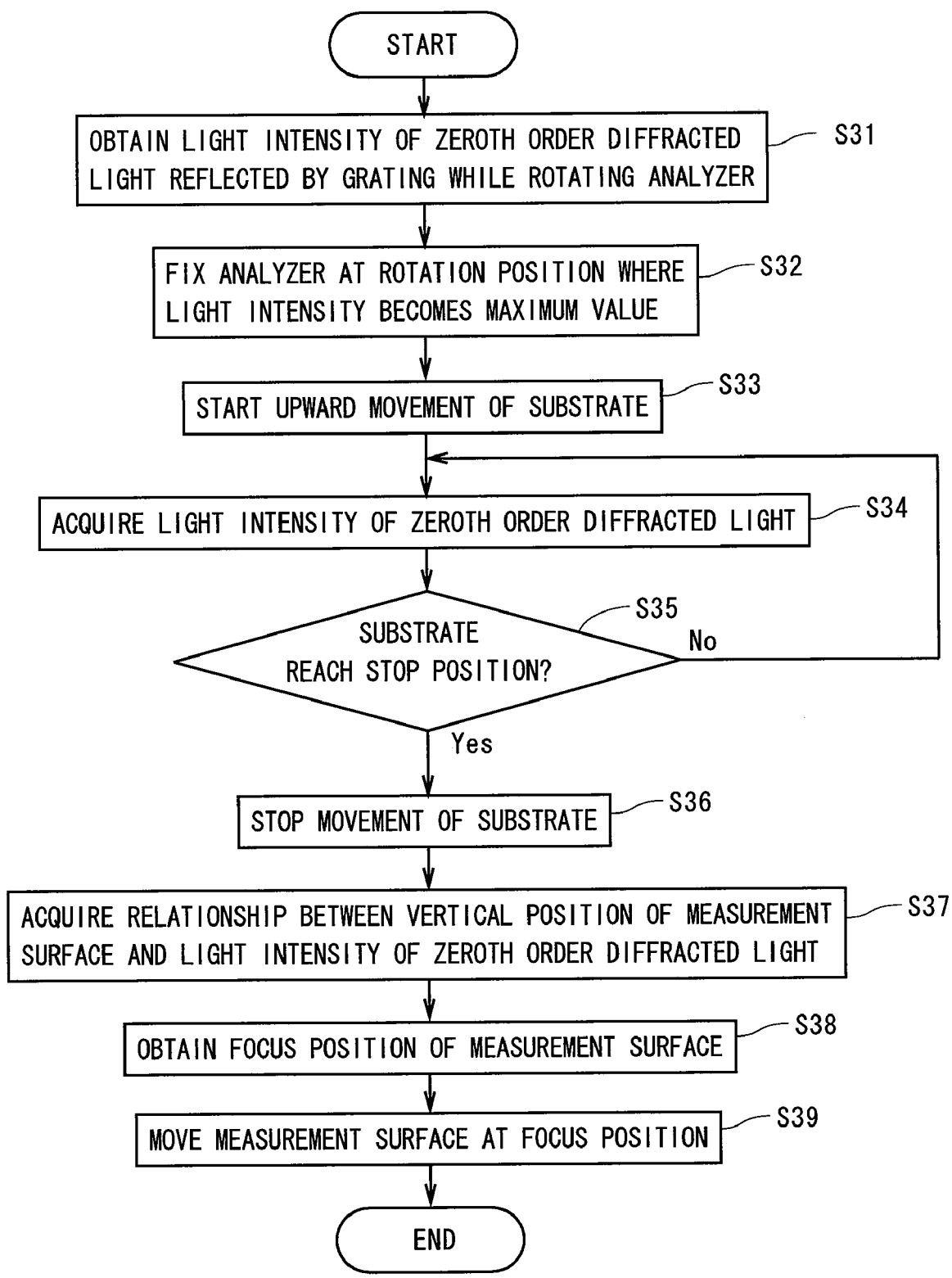
FIG. 8 is a flowchart showing a flow of focusing.

Next discussion will be made on focusing of the spectroscopic ellipsometer 1a. FIG. 8 is a flowchart showing a flow of focusing in the spectroscopic ellipsometer 1a. When focusing is performed, first, similarly to the first preferred embodiment, in a state where the measurement surface 91 of the substrate 9 is located at an analyzer adjustment position, light is applied from the lighting part 3 to the substrate 9, the analyzer 41 is rotated, and reflected light reflected on the substrate 9 is received by the spectrometer 42a. In the spectrometer 42a, light intensity (i.e., light amount) of the zeroth order diffracted light reflected by the grating 421 is acquired by the second light receiving device 424 (Step S31) and in the light receiving part 4, the analyzer 41 is fixed at a rotation position where the light intensity of the zeroth order diffracted light reflected by the grating 421 becomes the maximum value, the light intensity being output of the second light receiving device 424 (Step S32).

Subsequently, the substrate 9 starts to move from a movement start position toward the (+Z) direction by the elevating mechanism 24 (Step S33), reflected light of the polarized light which enters the measurement surface 91 of the substrate 9 from the lighting part 3, the polarized light being inclined to the measurement surface 91, is incident on the grating 421 through the slit plate 454, and zeroth order diffracted light reflected by the grating 421 is received by the second light receiving device 424 through the pinhole plate 423 to acquire light intensity of the zeroth order diffracted light (Step S34). The light intensity is outputted from the second light receiving device 424 to the focus information acquiring part 611 (see FIG. 3) in the control part 6.

In the spectroscopic ellipsometer 1a, until the substrate 9 reaches a predetermined stop position (Step S35), acquisition of the light intensity of the zeroth order diffracted light by the second light receiving device 424 is repeated (Steps S34, S35) while performing movement of the substrate 9 toward the (+Z) direction, application of the polarized light from the lighting part 3, and receiving of the reflected light by the spectrometer 42a. Then, upward movement of the substrate 9 is stopped at a stop position (Step S36), and in the focus information acquiring part 611 in the control part 6, a relationship between vertical position of the measurement surface 91 of the substrate 9 and output of the second light receiving device 424 (i.e., light intensity of the zeroth order diffracted light reflected by the grating 421) is acquired automatically (Step S37).

In the spectroscopic ellipsometer 1a shown in FIG. 7, the substrate 9 moves in the vertical direction (i.e., in the Z direction) and thereby, the reflected light incident on the spectrometer 42a also moves in the vertical direction. In a case where the measurement surface 91 of the substrate 9 is apart from the focus position in the vertical direction, the pinhole plate 423 blocks a part or all of incidence of the reflected light from the measurement surface 91 to the second light receiving device 424. That is, the pinhole plate 423 is an incidence restricting part which restricts incidence of the reflected light from the measurement surface 91 to the second light receiving device 424 in the case that the measurement surface 91 is apart from the focus position in the vertical direction.

Figure 9A:
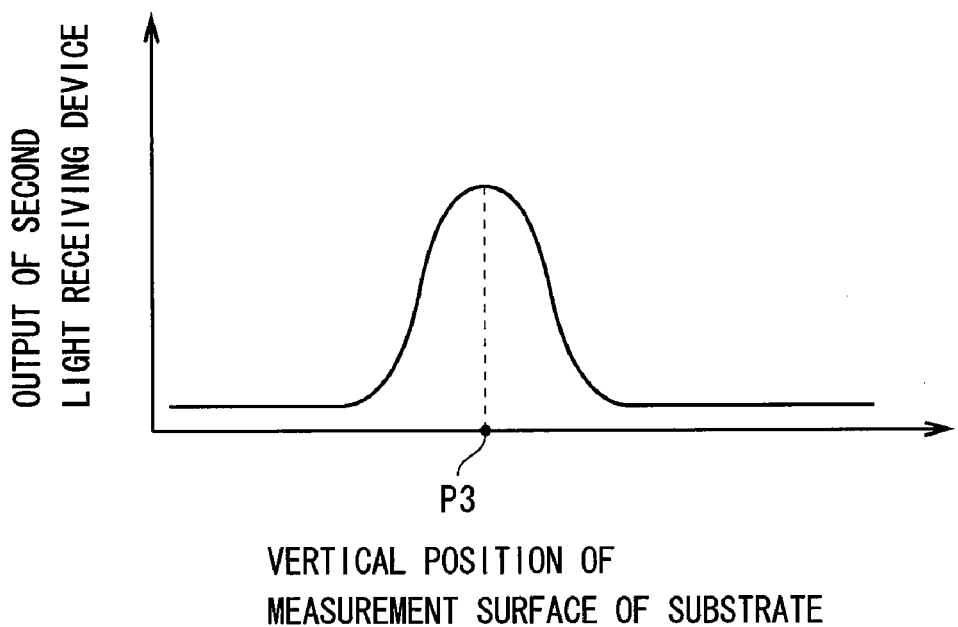
FIGS. 9A and 9B are graphs each showing a relationship between vertical position of a measurement surface of a substrate and output of a second light receiving device.

FIG. 9A is a graph showing the relationship between the vertical position of the measurement surface 91 of the substrate 9 and the light intensity of the zeroth order diffracted light reflected by the grating 421, the light intensity being outputted from the second light receiving device 424. As shown in FIG. 9A, the output of the second light receiving device 424 becomes the maximum value when the measurement surface 91 of the substrate 9 is located at a vertical position where the whole light directed to the pinhole plate 423 enters the second light receiving device 424 from the small aperture of the pinhole plate 423 (or the vertical position where the whole small aperture of the pinhole plate 423 is included in an irradiation region of the light which enters the pinhole plate 423).

In the spectroscopic ellipsometer 1a shown in FIG. 7, a vertical position P3 (see FIG. 9A) which is a vertical position of the measurement surface 91 where the output of the second light receiving device 424 is clearly maximum (i.e., a vertical position of the measurement surface 91 where the output of the second light receiving device 424 is larger in comparison with vertical positions close to the vertical position P3) is automatically acquired as the focus position (Step S38). Then, the elevating mechanism 24 is controlled by the control part 6, the substrate 9 moves in the vertical direction together with the stage 2 and the measurement surface 91 of the substrate 9 is positioned at the focus position, to thereby complete focusing of the spectroscopic ellipsometer 1a (Step S39).

As discussed above, in the spectroscopic ellipsometer 1a, similarly to the first preferred embodiment, since focusing is performed with use of the reflected light of the light which enters the measurement surface 91 of the substrate 9, the light being inclined to the measurement surface 91, it is possible to improve the accuracy of focusing as compared with the case where focusing is performed with use of the optical system of the vertical incident light type. Similarly to the first preferred embodiment, since an optical system used for ellipsometry and an optical system used for focusing are common, it is possible to eliminate influences of change of the optical systems by temperature change or the like and to achieve high accurate focusing. As a result, high accurate film thickness measurement can be achieved in the film thickness measuring apparatus having the spectroscopic ellipsometer 1a according to the second preferred embodiment.

In the spectroscopic ellipsometer 1a, before obtaining the relationship between the vertical position of the measurement surface 91 and the output of the second light receiving device 424, since the analyzer 41 is fixed at the rotation position where the output of the second light receiving device 424 is maximum, the relationship between the vertical position of the measurement surface 91 and the output of the second light receiving device 424 can be acquired with high accuracy and it is possible to further improve the accuracy of focusing.

In the spectroscopic ellipsometer 1a, especially, the small aperture of the pinhole plate 423 is smaller than the image of the aperture of the slit plate 454 in the heightwise direction of the image (i.e., the direction corresponding to the vertical direction of the aperture) which is projected on the pinhole plate 423 by the grating 421, and the zeroth order diffracted light reflected by the grating 421 enters the second light receiving device 424 through the small aperture of the pinhole plate 423. A range of vertical position of the measurement surface 91 where the output of the second light receiving device 424 is the maximum value (i.e., the range of vertical position including the focus position) is smaller than that in the first preferred embodiment, and the output of the second light receiving device 424 in the focus position is clearly maximum in the present preferred embodiment. Thus, it is possible to more easily obtain the focus position from the relationship between the vertical position of the measurement surface 91 and the output of the second light receiving device 424, as compared with the first preferred embodiment.

In the spectroscopic ellipsometer 1 according to the first preferred embodiment, since focusing is performed with the light receiving device 422 used for ellipsometry of the measurement surface 91 of the substrate 9, it is possible to simplify the constructions of the spectrometer and the spectroscopic ellipsometer in comparison with the spectroscopic ellipsometer 1a having the first light receiving device 422 for ellipsometry and the second light receiving device 424 for focusing.

Figure 9B:
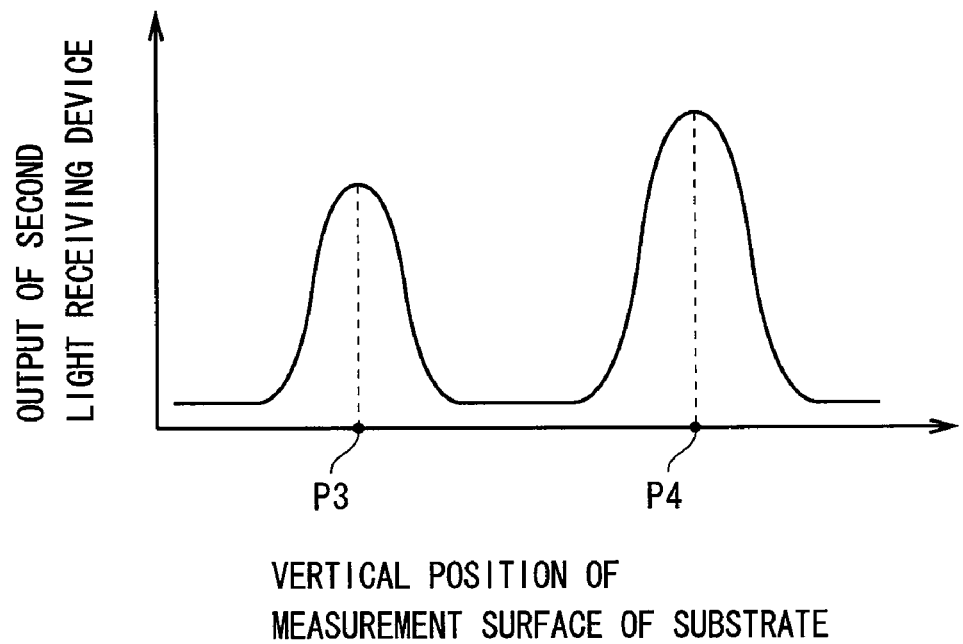

In focusing of the spectroscopic ellipsometer 1a according to the second preferred embodiment, in the relationship between the vertical position of the measurement surface 91 of the substrate 9 and the output of the second light receiving device 424 acquired in Step S37 in FIG. 8, there is a case where a plurality of vertical positions where the output of the second light receiving device 424 becomes maximum exist, as shown in FIG. 9B. In the above relationship shown in FIG. 9B, the output of the second light receiving device 424 in a left vertical position P3 is acquired in the case that polarized light reflected on an upper surface of a thin film formed on the measurement surface 91 is incident on the second light receiving device 424, and the output of the second light receiving device 424 in a right vertical position P4 is acquired in the case that polarized light reflected on a border surface between the thin film of the measurement surface 91 and a substrate main body (i.e., the border surface is an upper surface of the substrate main body) is incident on the second light receiving device 424. In this case, in the spectroscopic ellipsometer 1a, a lowest position out of a plurality of vertical positions P3, P4 is automatically acquired as the focus position by the focus information acquiring part 611 (see FIG. 3) in the control part 6.

Figure 11:
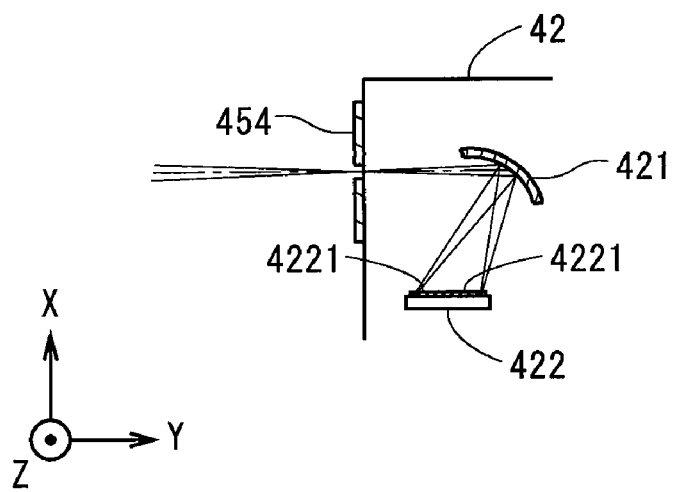
FIG. 11 is a plan view showing an internal constitution of a spectrometer.

Next, discussion will be made on a spectroscopic ellipsometer in a film thickness measuring apparatus in accordance with the third preferred embodiment of the present invention. FIG. 10 is a view showing a construction of a spectroscopic ellipsometer 1b according to the third preferred embodiment. FIG. 11 is a plan view showing an internal constitution of a spectrometer 42 in the spectroscopic ellipsometer 1b. The spectroscopic ellipsometer 1b has the same construction as the spectroscopic ellipsometer 1 shown in FIG. 1, and the same reference signs are given to the corresponding elements in the following description.

In the spectroscopic ellipsometer 1b, the orientation of the spectrometer 42 provided in the light receiving part 4 is different from that in the first preferred embodiment as shown in FIGS. 10 and 11. The spectrometer 42 in the spectroscopic ellipsometer 1b is positioned at a position where the spectrometer 42 of FIG. 1 is rotated by 90 degrees around the optical axis J2 in the light receiving part 4. In the spectrometer 42 in the spectroscopic ellipsometer 1b shown in FIGS. 10 and 11, a plurality of light receiving elements 4221 in the light receiving device 422 are arranged in a line along the splitting direction on the light receiving surface of the reflected light which is reflected on the measurement surface 91. In FIGS. 10 and 11, the light receiving elements 4221 are larger than they are, and the number of the light receiving elements 4221 is smaller than they are, for convenience of illustration.

In the spectroscopic ellipsometer 1b shown in FIG. 10, similarly to the first preferred embodiment, the substrate 9 moves in the vertical direction (i.e., in the Z direction) and thereby, the reflected light incident on the slit plate 454 in the light receiving part 4 also moves in the vertical direction. In a case where the measurement surface 91 of the substrate 9 is apart from the focus position by some distance in the vertical direction, the slit plate 454 blocks a part or all of incidence of the reflected light from the measurement surface 91 to the spectrometer 42.

In the spectroscopic ellipsometer 1b, especially, in a case where the substrate 9 moves from the focus position in the vertical direction in a range of incidence of light which is directed to the spectrometer 42 through the aperture of the slit plate 454, light incident on the grating 421 moves in the vertical direction, and spectrally split light led to the light receiving device 422 from the grating 421 also vertically moves in a direction which is almost perpendicular to the splitting direction on the light receiving surface (i.e., the splitting direction is an arrangement direction of the plurality of light receiving elements 4221 in the light receiving device 421) to be directed to positions which are away from the plurality of light receiving elements 4221.

Figure 12:
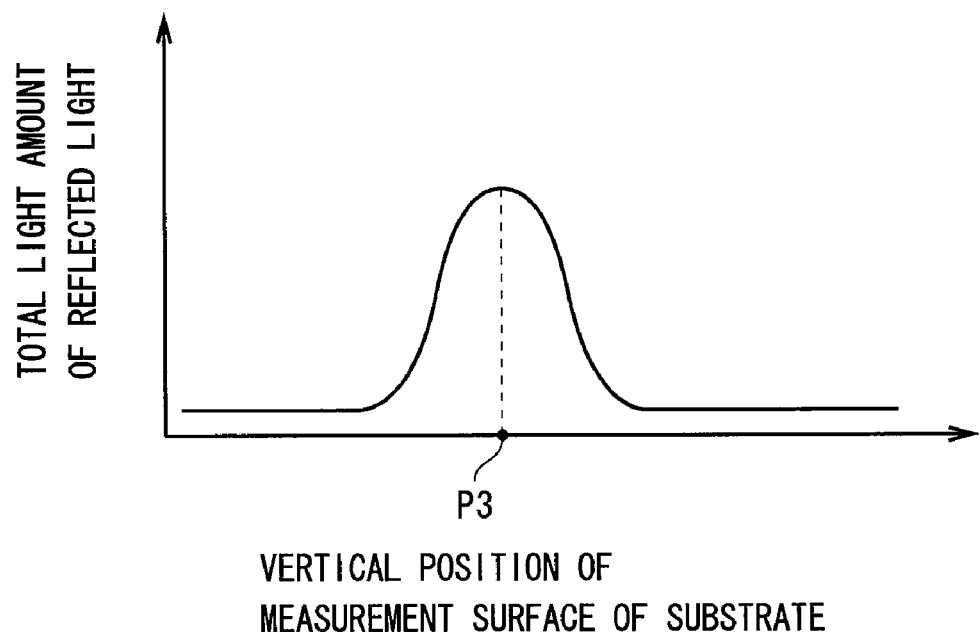
FIG. 12 is a graph showing a relationship between vertical position of a measurement surface of a substrate and total light amount of reflected light.

In the spectroscopic ellipsometer 1b, in a relationship between vertical position of the measurement surface 91 of the substrate 9 and total light amount in a predetermined wavelength band of the reflected light on the measurement surface 91, the relationship being acquired by the same method as the first preferred embodiment, a range of vertical position where the total light amount becomes the maximum value is narrow as shown in FIG. 12 and in the present preferred embodiment, a vertical position of the measurement surface 91 where the total light amount becomes clearly maximum (i.e., the position is a vertical position P3) exists.

In the relationship between the vertical position of the measurement surface 91 and the total light amount of the reflected light, since the range of vertical position of the measurement surface 91 where the total light amount becomes the maximum value is narrow, it is possible to more easily obtain the focus position of the measurement surface 91 included in the above range of vertical position in the spectroscopic ellipsometer 1b. Especially, like in the preferred embodiment, in the case where the vertical position of the measurement surface 91 where the total light amount becomes clearly maximum exists, it is possible to more easily obtain the focus position by acquiring the vertical position as the focus position.

Though the preferred embodiments of the present invention have been discussed above, the present invention is not limited to the above-discussed preferred embodiments, but allows various variations.

The grating 421 which is one type of spectral splitting devices is used in the spectrometer in the spectroscopic ellipsometer according to the above preferred embodiment, but spectrally splitting of the reflected light reflected on the measurement surface 91 may be performed by another type of spectral splitting device (e.g., a grating prism).

Though in the spectroscopic ellipsometer 1 according to the first preferred embodiment, the center position P1 in the range of vertical position of the measurement surface 91 of the substrate 9 where the total light amount of the reflected light becomes the maximum value, is regarded as a basis position of focusing and the focus position is determined on the basis of the modification value which is obtained in advance, the basis position is not limited to the center position P1, and a position other than the center position P1 may be obtained as a basis position from the relationship between the vertical position of the measurement surface 91 and the total light amount of the reflected light. In this case, a modification value representing a distance between the above basis position and the focus position is obtained in advance and stored in the modification value storing part 612 in the spectroscopic ellipsometer 1.

When the relationship between the vertical position of the measurement surface 91 of the substrate 9 and the total light amount of the reflected light is obtained in focusing, the total light amount is not necessarily a total of the light intensities in all the wavelength components of the reflected light which is received by the light receiving device 422, but may be a total of light intensities in at least part of wavelength band among all the wavelength components.

Calculation of the modification value used in determination of the focus position may be performed with use of the first substrate which is an object of film thickness measurement, instead of the test substrate. In this case, a portion having light scattering characteristics on a measurement surface of the substrate is used as a scattering surface and a part of the measurement surface of the substrate 9 is used as a smooth surface. Calculation of the modification value may be performed with use of a test substrate in which a part of a measurement surface is a smooth surface and another part of the measurement surface is a scattering surface which is located at the same position as the smooth surface.

In the spectroscopic ellipsometer 1a according to the second preferred embodiment, the relationship between the vertical position of the measurement surface 91 of the substrate 9 and the output of the second light receiving device 424 is not necessarily automatically obtained, but there may be a case where the user observes change of output of the second light receiving device 424 while changing the vertical position of the measurement surface 91 by automatically operating the elevating mechanism 24, and the user determines a position where the output of the second light receiving device 424 is considered to be maximum as the focus position. In this case, movement of the measurement surface 91 in the vertical direction may be performed only in the vicinity of a vertical position which is predicted as the focus position.

In the spectroscopic ellipsometers according to the above preferred embodiments, the analyzer 41 is not necessarily rotated in the light receiving part 4 in ellipsometry of the substrate 9, but for example, there may be a case where the analyzer 41 is fixed in the light receiving part 4 and a rotated phase shifter is provided on the side of the substrate 9 of the fixed analyzer 41. Also, the analyzer 41 is fixed in the light receiving part 4 and the polarizer 32 may be rotated in the lighting part 3.

Although in the above film thickness measuring apparatuses in the above preferred embodiments, a film thickness of a single layer film or a multilayer film formed on the substrate 9 is measured, the spectroscopic ellipsometer may be used in apparatuses other than the film thickness measuring apparatus, and a surface state or an optical constant other than the film thickness of the measuring surface 91 of the substrate 9 may be obtained on the basis of spectral intensity acquired in the spectrometer. Further, the spectroscopic ellipsometer may perform ellipsometry on a measurement surface of an object other than the semiconductor substrate.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2007-223897 filed in the Japan Patent Office on Aug. 30, 2007, the entire disclosure of which is incorporated herein by reference.

What is claimed is:

1. A spectroscopic ellipsometer, comprising:
   a holding part for holding an object having a measurement surface;
   an elevating mechanism for moving said object together with said holding part in a vertical direction perpendicular to said measurement surface;
   a lighting part for emitting polarized light to said measurement surface, said polarized light being inclined to said measurement surface;
   an analyzer where reflected light of said polarized light enters;
   a spectral splitting device for spectrally splitting said reflected light after passing through said analyzer, to obtain spectrally split light;
   a light receiving device for receiving said spectrally split light to acquire spectral intensity of said reflected light;
   a polarization state acquiring part for acquiring a polarization state at each wavelength of said reflected light on the basis of output of said light receiving device;
   an incidence restricting part which restricts incidence of said reflected light to said spectral splitting device when said measurement surface is apart from a focus position in said vertical direction; and
   a focus information acquiring part which obtains a total light amount in at least part of wavelength band of said reflected light on the basis of output of said light receiving device while said measurement surface moves by said elevating mechanism, to acquire a relationship between vertical position of said measurement surface and said total light amount.

2. The spectroscopic ellipsometer according to claim 1, further comprising:
   a modification value storing part for storing a modification value, in advance, which represents a distance between said focus position and a position which is obtained from said relationship between said vertical position of said measurement surface and said total light amount; and
   a focus position determining part for obtaining said focus position on the basis of said modification value and said relationship between said vertical position of said measurement surface and said total light amount.

3. The spectroscopic ellipsometer according to claim 1, further comprising
   a rotation mechanism for rotating said analyzer around a central axis parallel to an optical axis, wherein
   said measurement surface is located at a predetermined vertical position and said analyzer is rotated and fixed at a rotation position where said total light amount becomes a maximum value, before obtaining said relationship between said vertical position of said measurement surface and said total light amount.

4. The spectroscopic ellipsometer according to claim 1, wherein
   said light receiving device is a light receiving element array in which a plurality of light receiving elements are arranged in parallel with a splitting direction of said reflected light, and
   said spectrally split light moves in a direction perpendicular to said splitting direction on a light receiving surface of said light receiving device when said measurement surface moves from said focus position in said vertical direction.

5. A film thickness measuring apparatus for measuring a thickness of a film formed on an object, comprising:
   a spectroscopic ellipsometer for applying polarized light to a measurement surface on an object; and a film thickness calculation part for obtaining a thickness of a film formed on said measurement surface on the basis of a polarization state at each wavelength of reflected light, said polarization state being acquired by said spectroscopic ellipsometer, wherein said spectroscopic ellipsometer comprises:

a holding part for holding an object having a measurement surface;

an elevating mechanism for moving said object together with said holding part in a vertical direction perpendicular to said measurement surface;

a lighting part for emitting polarized light to said measurement surface, said polarized light being inclined to said measurement surface;

an analyzer where reflected light of said polarized light enters;

a spectral splitting device for spectrally splitting said reflected light after passing through said analyzer, to obtain spectrally split light;

a light receiving device for receiving said spectrally split light to acquire spectral intensity of said reflected light;

a polarization state acquiring part for acquiring a polarization state at each wavelength of said reflected light on the basis of output of said light receiving device;

an incidence restricting part which restricts incidence of said reflected light to said spectral splitting device when said measurement surface is apart from a focus position in said vertical direction; and a focus information acquiring part which obtains a total light amount in at least part of wavelength band of said reflected light on the basis of output of said light receiving device while said measurement surface moves by said elevating mechanism, to acquire a relationship between vertical position of said measurement surface and said total light amount.

6. The film thickness measuring apparatus according to claim 5, wherein said spectroscopic ellipsometer further comprises:

a modification value storing part for storing a modification value, in advance, which represents a distance between said focus position and a position which is obtained from said relationship between said vertical position of said measurement surface and said total light amount; and a focus position determining part for obtaining said focus position on the basis of said modification value and said relationship between said vertical position of said measurement surface and said total light amount.

7. The film thickness measuring apparatus according to claim 5, wherein said spectroscopic ellipsometer further comprises a rotation mechanism for rotating said analyzer around a central axis parallel to an optical axis, wherein said measurement surface is located at a predetermined vertical position and said analyzer is rotated and fixed at a rotation position where said total light amount becomes a maximum value, before obtaining said relationship between said vertical position of said measurement surface and said total light amount.

8. The film thickness measuring apparatus according to claim 5, wherein said light receiving device is a light receiving element array in which a plurality of light receiving elements are arranged in parallel with a splitting direction of said reflected light, and said spectrally split light moves in a direction perpendicular to said splitting direction on a light receiving surface of said light receiving device when said measurement surface moves from said focus position in said vertical direction.

9. A method of focusing in a spectroscopic ellipsometer, comprising the steps of:

a) emitting polarized light to a measurement surface on an object, said polarized light being inclined to said measurement surface;

b) spectrally splitting reflected light of said polarized light by a spectral splitting device, to obtain spectrally split light;

c) receiving spectrally split light by a light receiving device to acquire spectral intensity of said reflected light and obtaining a total light amount in at least part of wavelength band of said reflected light;

d) repeating said steps a) to c) while said measurement surface moves in a vertical direction perpendicular to said measurement surface under a condition where incidence of said reflected light to said spectral splitting device is restricted by an incidence restricting part when said measurement surface is apart from a focus position in said vertical direction, to obtain a relationship between vertical position of said measurement surface and said total light amount;

e) obtaining said focus position on the basis of said relationship between said vertical position of said measurement surface and said total light amount; and f) moving said measurement surface to said focus position.

10. The method according to claim 9, comprising, before said step e), the steps of:

g) directing said polarized light to a scattering surface on an object;

h) observing an irradiation region of said polarized light in said scattering surface;

i) repeating said steps g) and h) while said scattering surface moves in a vertical direction perpendicular to said scattering surface and obtaining a vertical position of said scattering surface where an area of said irradiation region becomes minimum, as a focus position; and j) performing said steps a) to d) on a smooth surface parallel to said scattering surface on said object, instead of said measurement surface, to acquire a relationship between vertical position of said smooth surface and said total light amount, and generating information used in calculation of said focus position in said step e).

* * * * *